(12) United States Patent
Diakoulas

(10) Patent No.: US 7,767,894 B1
(45) Date of Patent: Aug. 3, 2010

(54) MUSICAL GUIDE FOR GUITARS

(76) Inventor: Mara A. Diakoulas, 400 Greenwood Creek La., Grasonville, MD (US) 21638

( * ) Notice: Subject to any disclaimer, the term of this patent is extended or adjusted under 35 U.S.C. 154(b) by 0 days.

(21) Appl. No.: 12/357,144

(22) Filed: Jan. 21, 2009

(51) Int. Cl.
*G09B 15/00* (2006.01)
(52) U.S. Cl. ............ 84/477 R; 84/470 R; 428/41.8
(58) Field of Classification Search ........... 84/477 R, 84/483.2, 485 R
See application file for complete search history.

(56) References Cited

U.S. PATENT DOCUMENTS 5,920,023 A * 7/1999 Ravagni et al. ........... 84/485 R

2008/0087160 A1 * 4/2008 Gabert ................ 84/478
2008/0220195 A1 * 9/2008 Henshaw ............. 428/41.8

\* cited by examiner

*Primary Examiner*—Jianchun Qin
(74) *Attorney, Agent, or Firm*—Drinker Biddle & Reath LLP

(57) ABSTRACT

A musical guide and method for guitar playing includes providing a musical guide including a series of scales, chords or notes in the form of a temporary tattoo or sticker. The tattoo or sticker may be placed on the forearm of the user. As such, the user can match the sound to the note by glancing at their arm when needed. The student will be able to quickly find scale patterns by looking at their forearm.

9 Claims, 3 Drawing Sheets

FIG. 3
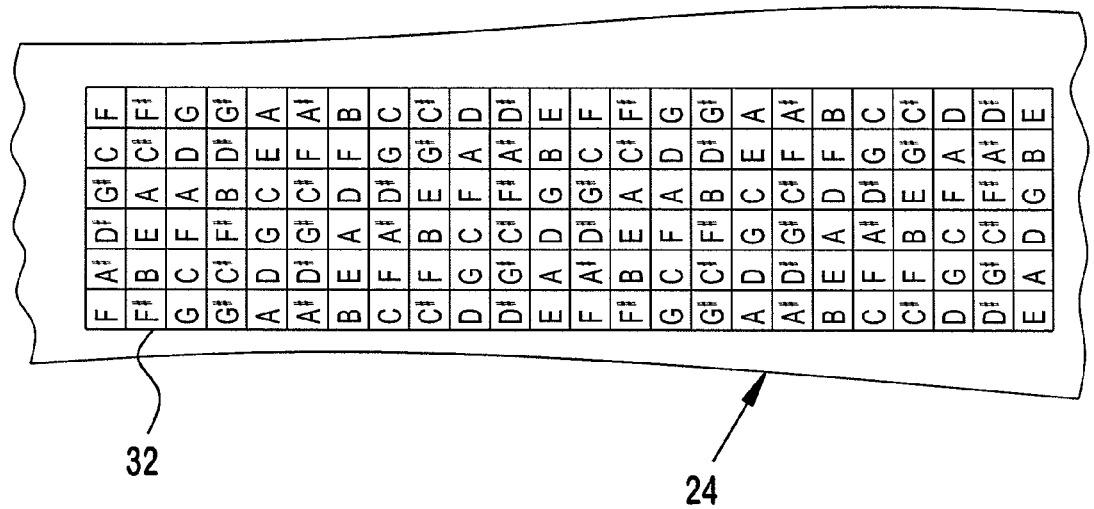
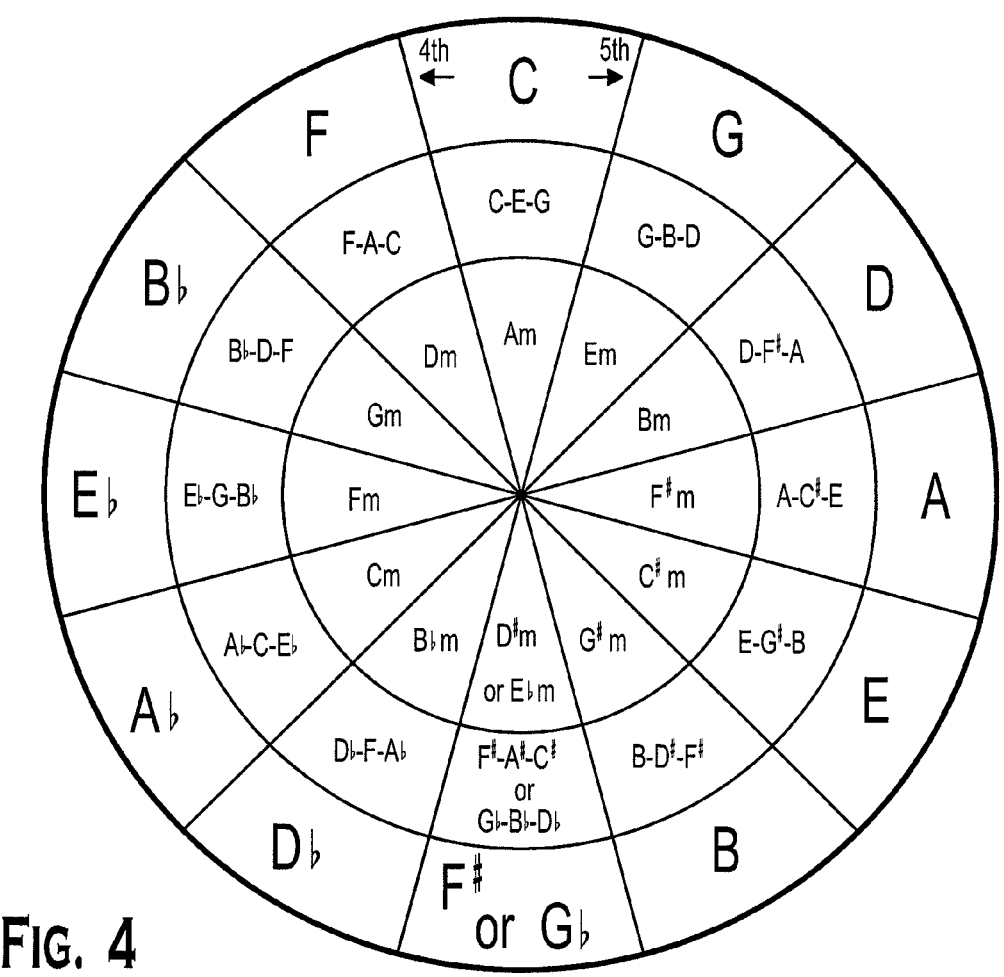
FIG. 4

MUSICAL GUIDE FOR GUITARS

FIELD OF THE INVENTION

The present invention generally relates to a musical guide for guitars. More particularly, the present invention pertains to providing musical guides in the form of temporary tattoos or stickers.

BACKGROUND DISCUSSION

The guitar is one of the most popular instruments to learn how to play. However, learning to play the guitar may often be a difficult undertaking. For example, a student learning to play the guitar will typically refer to a printed music guide or sheet music to determine where to visually place his or her fingers on the instrument. There are a few disadvantages to this type of learning. First, the student must look at the music guide or sheet music and then turn his or head back to the instrument to locate the notes on the instrument. Often times, the student must glance back and forth at the guide to find the proper finger placement. In addition, the sheet music may be easily lost or misplaced.

Accordingly, there is a need in the art for a musical guide that allows a student to easily see the guide without causing turning of the student's head. In addition, there is a need in the art for a musical guide that can not be easily lost or misplaced.

SUMMARY

According to a first aspect of the present invention, a musical guide is provided in the form of a temporary tattoo or sticker to be placed on a forearm of a student.

According to a second aspect of the present invention, a method of instructing, comprises placing a temporary tattoo or sticker including a series of notes, chords or scales on the forearm of a user.

BRIEF DESCRIPTION OF THE FIGURES

The accompanying drawings provide visual representations which will be used to more fully describe the representative embodiments disclosed herein and can be used by those skilled in the art to better understand them and their inherent advantages. In these drawings, like reference numerals identify corresponding elements.

FIG. 3 is a perspective the forearm of the guitar player with a tattoo of a musical guide in accordance with the present invention.

FIG. 4 is an example of a musical guide in accordance with the present invention.

DETAILED DESCRIPTION

Figure 1:
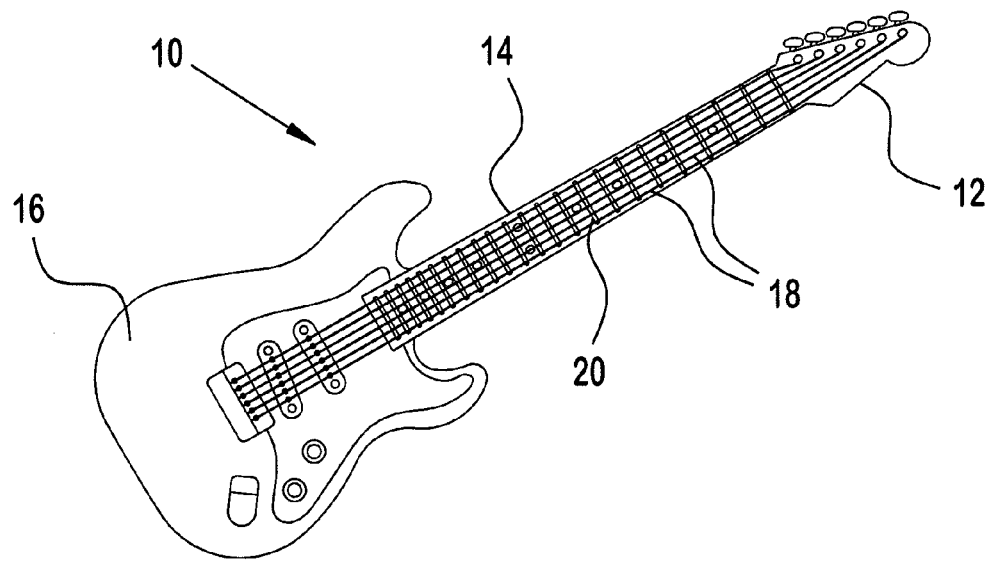
FIG. 1 is a plan view showing basic components of a guitar.

With reference to FIG. 1, a typical guitar 10 is shown including a headstock 12, neck 14 and body 16. A plurality of strings 18 extend from the headstock 12 to the top of the body 16. A plurality of frets 20 extend perpendicular to the strings 18. The basic components of a guitar are known, and therefore, only those components needed for an understanding of the invention are described.

Figure 2:
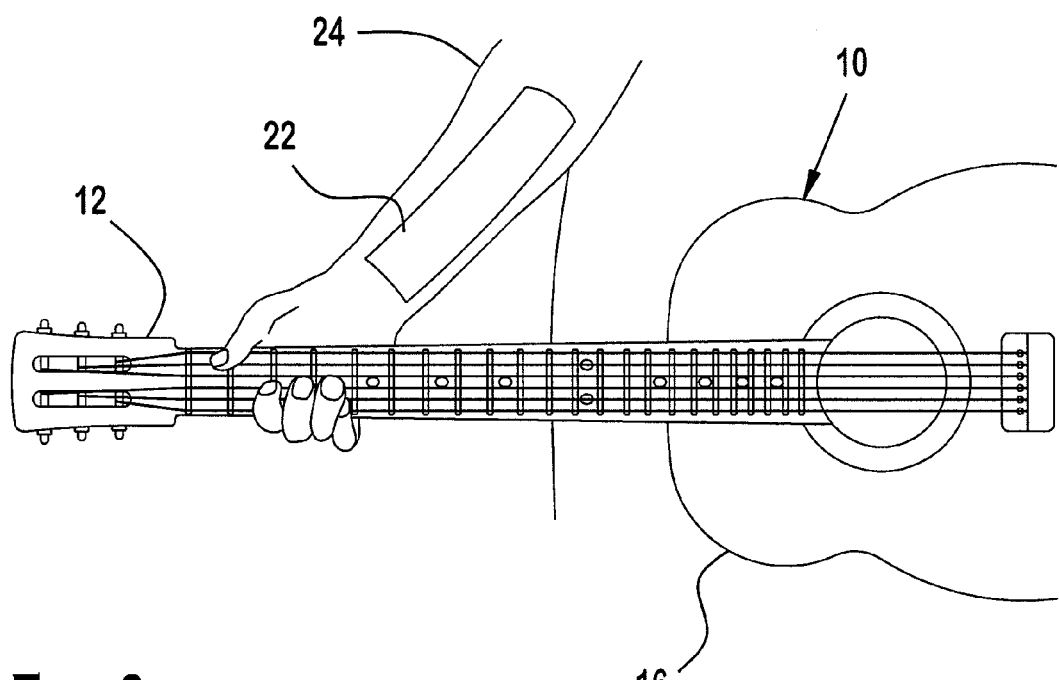
FIG. 2 is a perspective view of a guitar player with a tattoo of a musical guide in accordance with the present invention.

With reference to FIG. 2, the musical guide 22 in accordance with features of the present invention is shown. Preferably, the musical guide 22 is in the form of a temporary tattoo or sticker. The temporary tattoo or sticker 22 is preferably placed on the forearm 24 of the user which is holding the headstock 12. As such, the student can match the sound to the note by glancing at their arm when needed. Depending on which temporary tattoo or sticker the student chooses, the student also will be able to quickly find scale patterns by looking at their forearm. Although the present invention describes the tattoo to be placed on the forearm of the user, it may be placed on other locations of the body, such as the stomach, thigh, or any other location on the body.

The tattoo would be representations of different types of musical guides, including but not limited to scales, chords, etc. Examples of various guides are shown for example in FIGS. 3-5. With reference to FIG. 3, a musical guide 32 is shown. The musical guide 32 shown therein is a series of notes. Preferably, the notes are oriented on the musical guide 32 such that they can be read easily by the user during use. For example, when musical guide 32 is placed on the arm of the user, the notes are oriented in vertical columns for ease of reading. However, it should be understood that the notes may be in any order or orientation, depending on application and design preference. The temporary tattoos of the notes of the guitar are not limited to black print, but may also be printed in color. For example, each note may have a unique color which will make it easier for the student to identify the same notes on the neck of the guitar. However, color may be used in other ways to help distinguish notes and scales.

Figure 5:
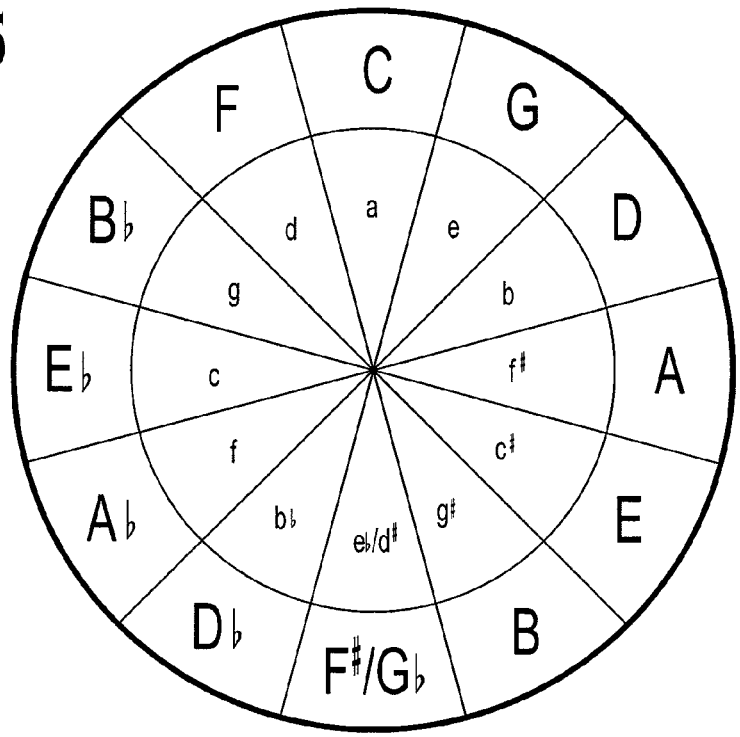
FIG. 5 is yet another example of a musical guide in accordance with the present invention.
Figure 6:
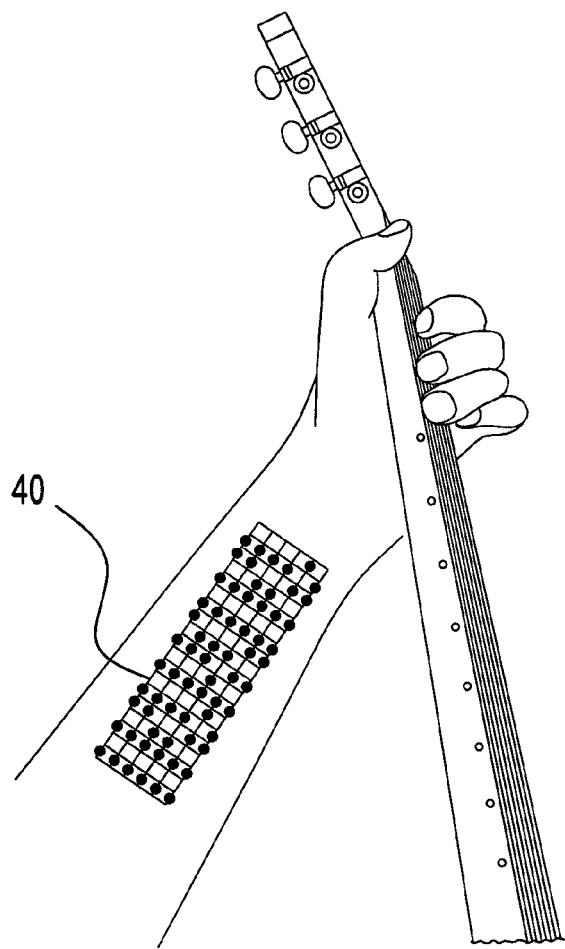
FIG. 6 is a perspective view of a guitar player with a musical guide in accordance with another embodiment of the present invention.

FIGS. 4 and 5 show different types of a circle of 5ths. It should be understood that the examples described in FIGS. 3-5 are only examples. As such, any type of musical aid used for guitars may be made in the form of a temporary tattoo or sticker to be placed on the arm of a user. In addition, the temporary tattoo or stickers may be made in various sizes and forms, depending on design preference and application. Importantly, the tattoo or sticker must be adequately sized so that the chords, notes or scales are legible on the forearm. With regard to the musical guide shown in FIGS. 3 and 6, the musical guide will preferably be between about 1-6 inches along a width and about 4-10 inches along a length. However, this range can be larger or smaller and will vary depending on size of user and length of the user's arm. With regard to the guides shown in FIGS. 4 and 5, the musical guide will have a diameter of between about 1-6 inches. However, this range can be larger or smaller and will vary depending on the size of the user and length of the user's arm.

In music, a scale is an ascending or descending series of notes or pitches. Though the scales from musical traditions around the world are often quite different, the pitches of the notes in any given scale are usually related by a mathematical rule. Each note in a scale is referred to as a scale degree. The idea is to have a variety of scales from around the world. An advantage to the present invention is that manufacture and distribution of the tattoos of the present invention will allow people across the world to share various scales.

In addition, finding notes and scale patterns and knowing which note is being played is very beneficial for the musician to compose and share their ideas. When the musicians wear their musical guides on stage, they can move more freely. Band mates can also share same scales while playing together.

The presently disclosed embodiments are considered in all respects to be illustrative and not restrictive. The scope is indicated by the appended claims, rather than the foregoing description, and all changes that come within the meaning and range of equivalents thereof are intended to be embraced.

I claim:

1. A musical guide for learning how to play a guitar, comprising:
   a series of musical notes, chords, or scales for learning how to play the guitar;
   wherein said musical guide is sized to be placed on a forearm of a user in the form of a temporary tattoo;
   wherein said musical guide being portable and useable for learning said series of musical notes, chords, or scales separately from the guitar.

2. The musical guide of claim 1, wherein the notes, chords or scales are oriented on the tattoo in vertical columns.

3. The musical guide of claim 1, wherein the tattoo is in the form of the circle of fifths.

4. The musical guide of claim 1, wherein the tattoo is rectangular in shape.

5. The musical guide of claim 4, wherein the tattoo is sized to be between about 1-6 inches in width by 4-10 inches in length.

6. The musical guide of claim 1, wherein the tattoo is circular in shape.

7. The musical guide of claim 6, wherein a diameter of the tattoo is between about 1-6 inches.

8. The musical guide of claim 1, wherein the scales, notes or chords are color coded.

9. The musical guide of claim 8, wherein each note is given a unique color.

* * * * *